May 12, 1970  F. M. LATHROP ET AL  3,511,082
LEAK DETECTING APPARATUS FOR VALVES
Filed May 7, 1968
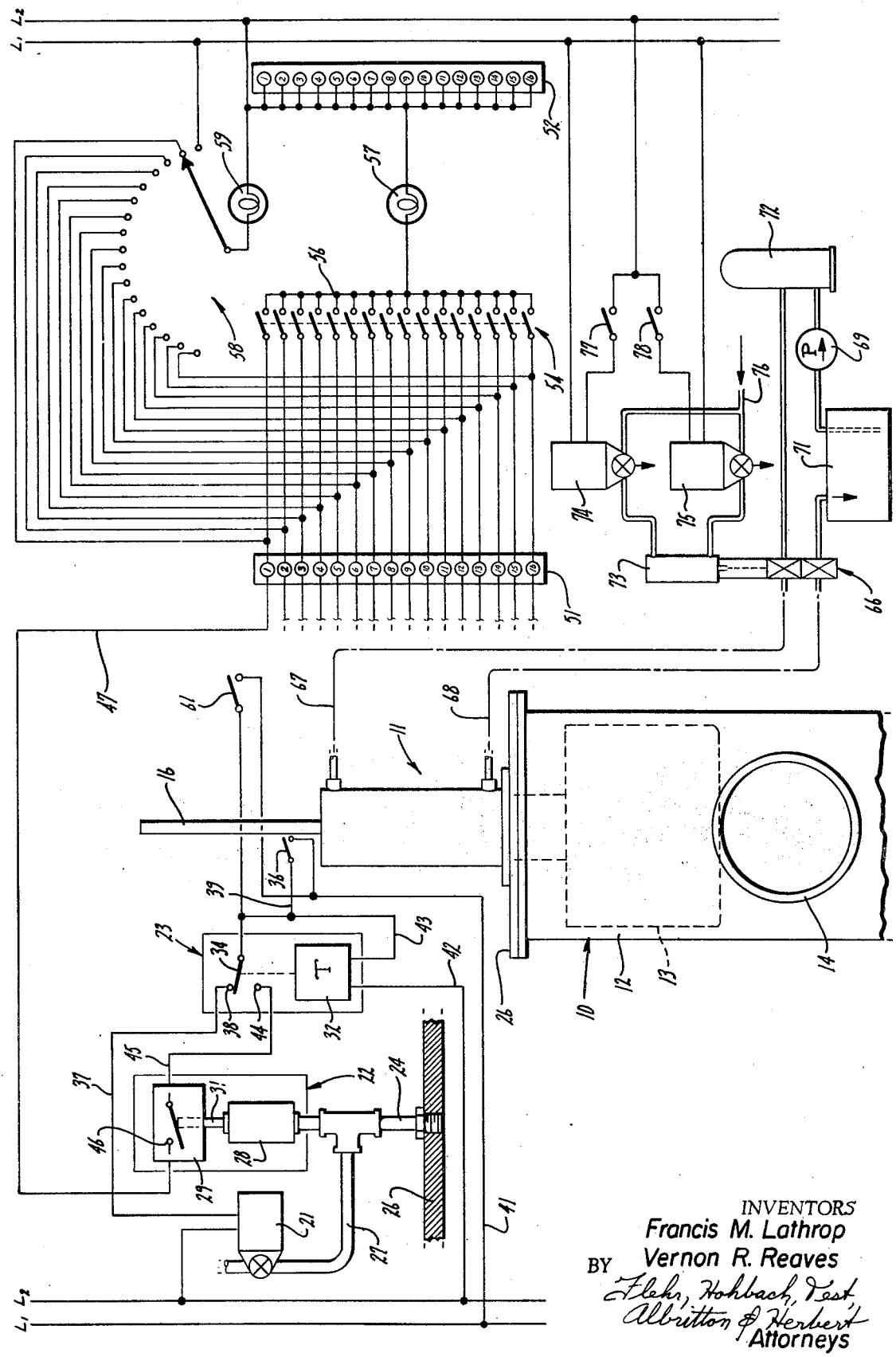
INVENTORS
Francis M. Lathrop
Vernon R. Reaves
BY
Flehr, Hohbach, Test,
Albritton & Herbert
Attorneys

United States Patent Office 3,511,082
Patented May 12, 1970

3,511,082
LEAK DETECTING APPARATUS FOR VALVES
Francis M. Lathrop and Vernon R. Reaves, Houston, Tex., assignors to M & J Valve Company, Houston, Tex., a corporation of Delaware
Filed May 7, 1968, Ser. No. 727,296
Int. Cl. G01m 3/04
U.S. Cl. 73—46                5 Claims

ABSTRACT OF THE DISCLOSURE

Leak detecting apparatus for use with valves of the type having sealing means surrounding the inlet and outlet flow passages. A vent valve connects with the closed body space of the valve and is operated to vent the body space to atmosphere. A pressure responsive means also connects with the closed body space and is sensitive to any build-up of pressure in the body following venting. The vent valve and the pressure sensitive means are co-related with timing means and means on the main valve whereby when the main valve is closed an automatic cycle is initiated in which the vent valve is opened for a predetermined period of time and then closed and the pressure sensitive means connected with an indicating device to indicate a build-up of pressure due to valve leakage.

BACKGROUND OF THE INVENTION

In various industrial systems where valves are installed to control liquid flow, the leakage of one or more valves may be of serious consequence. For example, in various systems such as tank farm installations, booster stations, tanker dock unloading facilities or meter provers, the leakage of a valve may result in substantial losses of product or metering accuracy. One form of leak detector which has been satisfactory is disclosed in copending application Ser. No. 548,724, filed May 9, 1966 now Pat. No. 3,398,761. In that instance a vent valve is installed on the valve body in communication with the closed body space. When this vent valve is actuated the body pressure is reduced to atmospheric. Pressure sensitive means is also in communication with the body space, whereby immediately after venting, if the pressure in the body space builds up, a leak is indicated and a remote indicating device such as a signal lamp can be operated. Such a leak detector can be incorporated with one or more valves of a meter prover system as shown in copending application Ser. No. 569,362, filed Aug. 1, 1966, now Pat. No. 3,423,988 with indicator being located at the control panel. One difficulty with such arrangements is that they require separate operator actuation, and in general there is no correlation between operation of the valves and the leak indicating cycle. Also, a false indication may result by increase in body pressure when the valve is opened.

SUMMARY OF THE INVENTION AND OBJECTS

The invention relates generally to leak detectors in combination with flow valves, and particularly to systems where it is desired to provide a leak indication at a remote point.

In general it is an object of the invention to provide apparatus of the above character which has an automatic cycle of operation.

Another object of the invention is to provide apparatus of the above character which carries out its functioning as an automatic cycle when the valve being tested is moved to closed position.

Another object of the invention is to provide apparatus of the above character which is adapted for use in systems where a plurality of flow control valves are employed. In this connection the invention makes it possible to provide an indication of valve leakage with respect to any of the valves of the system, and in addition makes it possible for the operator to isolate and identify the particular leaking valve.

In general, the present invention consists of a vent valve means which is in communication with the closed body space of the valve, and which can be actuated to vent the body space to atmosphere. Means including a timing device serves to close the vent valve after it has been opened for a predetermined period of time. Also means serves to indicate a build up of body pressure after such venting.

Additional objects and features of the invention will appear from the following description in which the preferred embodiment has been set forth in detail in conjunction with the accompanying drawing.

BRIEF DESCRIPTION OF THE DRAWING

The single figure of the drawing schematically illustrates application of my invention to one or more valves for leak indication.

DESCRIPTION OF THE PREFERRED EMBODIMENTS

The drawing illustrates a valve 10 of the gate type, which in this instance is provided with a power operator 11 of the hydraulic cylinder-piston type. It may for example be a gate valve of the kind shown in Grove 3,339,886, which has a fabricated box-like body 12 and an inner slab-type gate 13. The hubs 14 on the ends of the body are adapted for connection with associated piping. The valve may be of the short gate type, or may be of the through-port type in which event the gate has an opening which registers with the flow passages through the hubs 14 for open position of the valve. Assuming use of a hydraulic power operator as illustrated, the inner piston can be carried by a rod which in turn is directly coupled to the upper end of the gate 13. Also the piston may be attached to a visual indicating rod 16 extending from the upper end of the cylinder. With valves of this type and other valves having an inner valve member movable between two limiting positions corresponding to open and closed valve condition, annular sealing assemblies are provided which provide seals between the gate or other valve member, and the adjacent body walls. For example, with a gate valve of the type shown in said Pat. 3,339,886, sealing assemblies are carried by the end walls of the body, and serve to make fluid-tight contact with the side valve working surfaces of the gate. The body provides a closed space surrounding the gate 13, and this space is sealed with respect to the line when the gate is in closed position. Sealing assemblies that may be used in such valves are disclosed in Pat. 3,293,342 and 3,269,695.

When a valve as described above is closed, the body space can be vented to atmospheric pressure. After venting is discontinued the body pressure will not build up unless leakage occurs between the upstream side of the valve and the body space.

As indicated schematically in the drawing, the present invention employs a vent valve 21, preferably of the solenoid operated type, together with pressure sensitive means 22 and timing means 23. As representative of suitable means for making connection with the body space of the valve 10, I have shown a pipe 24 which is threaded into the top wall 26 of the valve. The vent valve 21 is in communication with pipe 24 through pipe 27, and also vents to the atmosphere. The pressure sensitive means 22 consists of a cylinder-piston device 28, with the piston operating against a compression spring, whereby the piston takes a position depending upon the applied pressure. Also the means 22 includes an electrical switch 29, the blade of which is shown engaged by a rod 31 which extends into device 28 and is attached to the inner piston. When sufficient pressure is applied to the device 28, the rod 31 closes the contacts of switch 29.

The timing means 23 consists of timer 32 which can be of the thermal bi-metal type mechanically connected to operate the blade of switch 34.

In addition to the parts described above, there is a switch 36 which is associated with the valve 10 and which is adapted to be closed when the valve is moved to closed position. This switch may be associated with the indicator rod 16, and may be engaged mechanically or operated magnetically to close when the gate of the flow valve 10 is moved to closed position.

The electrical circuit connections for the parts described above may be as follows. Lines L-1 and L-2 represent a current supply. One terminal of the winding for the solenoid valve 21 is connected to line L-2, and the other terminal is connected by conductor 37 to the contact 38 of timer switch 34. The blade of switch 34 is connected by conductor 39 to one side of the switch 36, and the other side of this switch is connected by conductor 41 to line L-1. One terminal of the heating resistor of timer 32 is connected by conductor 42 to line L-2. The other terminal is connected by conductor 43 with conductor 39 and the switch 36. The contact 44 of timer switch 34 is connected by conductor 45 to the blade of switch 29, and the contact 46 of this switch is connected by conductor 47 through an indicating device to the line L-2.

While the lamp or other indicating device employed may be located near the valve 10, it is generally desirable to have the indicator at a remote control station. Thus it is assumed that a control panel is provided at a remote point, and that this panel includes the connector strips 51 and 52. The numbers 1–16 on strip 51 represent terminals which are to be connected to various leak detectors associated with as many as sixteen valves. Thus the one valve illustrated has its conductor 47 connected to the No. 1 terminal of strip 51. Strip 52 has terminals which are all connected to the line L-2. A multicontact gang operated switch 54 is provided with a set of contacts corresponding to each of the valves. Each set of contacts has one side connected to a corresponding terminal on strip 51, and its other side connected to a common conductor 56 for all of the switch contacts. An indicating device 57, which in this instance is a small lamp, is connected between common conductor 56 and the common conductor 57 for the strip 52.

A manually operated selector switch 58 is shown having seventeen contacts, with sixteen of these contacts connected to corresponding terminals on the strip 51. Another indicating device 59, such as a lamp, is connected between the arm of switch 58 and line L-2.

The solenoid vent valve 21, pressure sensitive device 28, switch 29 and the timer 23 are normally mounted directly upon the flow valve 10. It is desirable in this connection to mount all of these parts in an explosion proof chamber.

The particular hydraulic system shown connected to the operator 11 consists of a four-way control valve 66 connected to the power operator 11 by lines 67 and 68. A hydraulic pump 69, which may be driven by an electric or gas motor, has its suction side connected to the reservoir 71, and its pressure side either connected directly to the four-way valve 66 or to an accumulator 72 which connects to the four-way valve. The control of the drive to pump 69 can be such that the pump maintains a predetermined liquid pressure in the accumulator 72. Four-way valve 66 is also connected to return liquid to the reservoir 71. The operating member of the four-way valve 66 is shown connected to a double acting pneumatic device 73 of the cylinder-piston type. Air supply to the device 73 is controlled by the solenoid valves 74 and 75 which connect to a common air supply line 76. When solenoid valve 74 is electrically energized, it causes air pressure to be supplied to one end of the device 73, thereby moving the control valve 66 to one of its operating positions. When solenoid valve 74 is deenergized, air from the device 73 is vented to the atmosphere as illustrated. Energizing solenoid valve 75 similarly applies air under pressure to the other end of the device 73, thus moving the four-way valve 66 to its other operating condition. Switches 77 and 78 can be operated manually or otherwise for selectively energizing the solenoids 74 and 75.

Operation of the apparatus is as follows. Starting with the valve 10 in open position, power operation is initiated by the hydraulic system connected to the hydraulic cylinder-piston 11. With the particular arrangement illustrated, this involves closing the switch 77, although in other systems closing may be initiated automatically, or by controlling the electrical motor driving the pump 69. When the valve 10 reaches full closed position the switch 36 is closed, thus completing a circuit between the lines L-1 and L-2 which includes the switch 36, conductor 39, contact 38 of switch 34, conductor 37 and solenoid 21. Also current is applied to the timer 32, since this time is connected by conductors 42 and 43 between conductor 39 and line L-2. Current thus applied to the winding of solenoid valve 21 opens this valve whereby pressure in the closed body space of the valve 10 is vented to the atmosphere through pipe 24. Timer 32 provides a predetermined venting interval, as for example, fifteen seconds. This interval is sufficient to vent the body space to atmospheric pressure. At the end of the timing period, the switch 34 closes upon contact 44, thus interrupting current flow through the winding of solenoid valve 21, whereby this valve is closed. At the same time a circuit is established which includes conductor 41, switch 36, conductor 39, contact 44 of switch 34, switch 29, conductor 47, and the indicator lamp 57. When the pressure in the body space of valve 10 is atmospheric, switch 29 remains open, and therefore the indicator lamp 57 is not illuminated. However, if leakage should occur from the line through the upstream seal of the valve gate, pressure builds up in the body space whereby switch 29 is closed, thus applying current to the indicator lamp.

Assuming that a plurality of flow valves, each provided with their transmitters, are connected in the system in the manner described above, then the indicator lamp 57 will be illuminated when one out of the several valves is subject to leakage. If the operator wishes to determine which one of the several valves is leaking, the multicontact switch 54 is opened, and the arm of switch 58 moved to find a position where lamp 59 is illuminated, thereby locating the defective valve. The extra contact on the selector switch 58 serves as a means for testing the lamp 59.

When the valve 10 is operated from closed to open position, the initial part of the gate movement opens the switches 36 before the gate movement has progressed sufficiently far to establish communication between the upstream side of the valve and the body space. Therefore, assuming that the indicating lamp is not illuminated at the time such movement commences, it will not be flashed on by build up of pressure in the closed body space before opening of the switch 36.

In some instances it may be desirable to cycle the transmitter at the valve and to determine valve leakage without opening the valve 10, or in other words, without opening of the switch 36. For this purpose, I have shown a separate switch 61 shunted across the switch 36, and which may be operated manually or automatically.

As is well known to those familiar with power operators for valves, limiting devices can be applied whereby when the valve is moved to one extreme position, further power application is discontinued. Such limiting devices may be in the form of limiting switches, which serve to break holding circuits for the switches 77 and 78. Also in instances where the accumulator 72 is not used, the limiting devices may be electrical switches which control the current supply to the electrical motor for pump 69. Irrespective of the particular manner in which the power operator of the valve 10 is controlled, in the present invention the operation of the valve 10 and of similiar valves used in the system is coordinated with the leak detecting means whereby a leak detection cycle is carried out automatically when the valve is closed. Also it is automatically disabled when the valve is opened. This means that with a power operator of the type which is initiated by operation of a single member, such as the pressing of an electrical pushbutton, one initiates operation of the valve while at the same time initiating an automatic leak detecting cycle.

In addition to utilizing limiting devices in the manners explained above, it is generally advisable to provide means for indicating whether or not each valve is in open or closed condition. This can be accomplished by simple known types of indicator systems making use of indicator lamps at the control panel which are connected to circuits including switches that are operated at the extreme limiting positions of the valve.

We claim:

1. Valve leak detecting apparatus for use with a fluid flow valve of the type having a valve body with inlet and outlet openings adapted to be connected to associated piping, a valve member disposed within the body and movable between open and closed valving positions with respect to the openings, and sealing means between the body and valve member and generally surrounding each of said openings, there being a closed body space within the valve body surrounding the valve member, said apparatus comprising a venting valve having communication with the valve body space and adapted to be actuated to vent the space to atmosphere, means for actuating the vent valve to thereby vent the valve body space to atmosphere, means including a timer adapted to be energized for a timing cycle, means serving to energize the timer simultaneously with actuation of the vent valve, means controlled by the timer for restoring the vent valve to closed position after a predetermined venting period, and means for indicating a build-up of pressure within the body space after said vent valve has been closed.

2. Apparatus as in claim 1 in which said last named means includes a pressure sensitive device in communication with said space together with an indicator device.

3. Apparatus as in claim 1 together with means responsive to closing of the flow valve for actuating said vent and timer.

4. Leak detecting apparatus for use with flow valves of the type comprising a valve body having inlet and outlet openings adapted to be connected to associated piping, a valve member disposed within the body and movable between open and closed valving positions with respect to the openings, and sealing means generally surrounding each of said openings and forming seals between the valve member and the body, there being a closed body space within the valve body surrounding the valve member, said apparatus comprising a normally closed solenoid operated venting valve having communication with the body space, said venting valve when electrically actuated serving to vent pressure within the body space to the atmosphere, pressure sensitive means also communicating with the valve body space, and last means including switch contacts that are closed when the pressure in the body space reaches a predetermined value above atmospheric, timing means including electrical contacts and adapted when electrically energized to close certain of its contacts for a predetermined period of time and then to open such contacts and to close a second set of contacts, switch means located at the flow valve and comprising normally open contacts adapted to be operated when the valve member of the line valve is moved to its closed position, a remote indicating device adapted to be electrically energized, and electrical circuitry including a current supply source connected to the solenoid vent valve, the contacts of the pressure operated switch means, the timing means and to the switch contacts operated by the timing means, said circuitry being arranged so that when the contacts of the switch means located at the line valve are operated by closure of said valve, the solenoid valve is electrically actuated through the switch contacts of the timing means to vent the valve body space to atmospheric pressure, and after a predetermined time delay the vent valve is de-energized and thereby closed and a circuit is established to the indicating device which includes the contacts of the pressure sensitive means, so that in the event of pressure build-up in the body space the contacts of the pressure sensitive means are closed to actuate the remote indicating device.

5. A system comprising a plurality of leak detector apparatuses as in claim 4 with a common indicator device, and means including a selector switch and a separate indicator device for selecting a leaking flow valve from the other flow valves.

References Cited

UNITED STATES PATENTS

| | | | |
|---|---|---|---|
| 2,472,973 | 6/1949 | Hoffman et al. | 73—40 |
| 3,331,237 | 7/1967 | Strang | 73—40 |
| 3,398,761 | 8/1968 | Grove et al. | 73—40.5 XR |
| 3,423,988 | 1/1969 | Grove et al. | 73—3 |

S. CLEMENT SWISHER, Primary Examiner

W. A. HENRY, Assistant Examiner